United States Patent
Yamane et al.

(10) Patent No.: US 7,590,411 B2
(45) Date of Patent: Sep. 15, 2009

(54) COMMUNICATION TERMINAL OPERATIONAL WITH MULTIPLE APPLICATIONS

(75) Inventors: Naoki Yamane, Tokyo (JP); Kazuhiro Yamada, Yokohama (JP); Dai Kamiya, Tokyo (JP); Satoshi Washio, Tokyo (JP); Masayuki Tsuda, Tokyo (JP); Atsuki Tomioka, Yokohama (JP); Nobuyuki Watanabe, Sayama (JP); Yasunori Hattori, Fujisawa (JP); Masato Takeshita, Mitaka (JP); Masakazu Nishida, Yokosuka (JP); Mao Asai, Yokosuka (JP); Naoki Naruse, Yokohama (JP); Yuichi Ichikawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/809,278

(22) Filed: Mar. 25, 2004

(65) Prior Publication Data
US 2004/0242205 A1 Dec. 2, 2004

(30) Foreign Application Priority Data
Mar. 25, 2003 (JP) ............................. 2003-083556

(51) Int. Cl.
*H04L 12/58* (2006.01)
(52) U.S. Cl. .................. 455/412.1; 709/206; 709/250
(58) Field of Classification Search ............. 455/412.1, 455/412.2, 413, 414.1, 466, 566.2, 558, 566, 455/567; 709/206, 250; 379/93.24, 100.08, 379/100.09; 715/864; 358/402, 407
See application file for complete search history.

(56) References Cited

U.S. PATENT DOCUMENTS

| | | | | |
|---|---|---|---|---|
| 5,765,170 A * | 6/1998 | Morikawa | ..................... | 707/200 |
| 6,088,696 A * | 7/2000 | Moon et al. | ................... | 707/10 |
| 6,453,338 B1 * | 9/2002 | Shiono | ....................... | 709/206 |
| 6,598,076 B1 * | 7/2003 | Chang et al. | ................ | 709/206 |
| 6,809,724 B1 * | 10/2004 | Shiraishi et al. | ............. | 345/169 |
| 6,871,215 B2 * | 3/2005 | Smith et al. | ................. | 709/206 |
| 7,237,009 B1 * | 6/2007 | Fung et al. | .................. | 709/206 |
| 7,328,244 B1 * | 2/2008 | Kelley | ......................... | 709/206 |
| 2002/0010748 A1 * | 1/2002 | Kobayashi et al. | ......... | 709/206 |
| 2002/0016823 A1 * | 2/2002 | Ueno et al. | ................. | 709/206 |
| 2002/0046249 A1 * | 4/2002 | Shiigi | ......................... | 709/206 |

(Continued)

FOREIGN PATENT DOCUMENTS

EP 0 936 786 A2 8/1999

(Continued)

OTHER PUBLICATIONS

Gong, L. DK12SPEC, "Java Security Architecture (JDK 1.2). Version 1.0" XP-002171445, Dec. 6, 1998, 62 Pages.

(Continued)

*Primary Examiner*—Patrick N Edouard
*Assistant Examiner*—Anthony S Addy
(74) *Attorney, Agent, or Firm*—Brinks Hofer Gilson & Lione

(57) ABSTRACT

A native mailer operated in accordance with a native program installed by a manufacturer of mobile phone 200 obtains an e-mail generated by using an application mailer. A native mailer obtains an e-mail, and stores in a folder for an application mailer, an e-mail generated by using an application mailer.

23 Claims, 6 Drawing Sheets

U.S. PATENT DOCUMENTS

| | | | |
|---|---|---|---|
| 2002/0120869 A1* | 8/2002 | Engstrom | 713/201 |
| 2002/0143885 A1* | 10/2002 | Ross, Jr. | 709/207 |
| 2003/0061270 A1* | 3/2003 | Suzuki et al. | 709/203 |
| 2003/0110211 A1* | 6/2003 | Danon | 709/203 |
| 2003/0120496 A1* | 6/2003 | Alfred et al. | 705/1 |
| 2004/0078752 A1* | 4/2004 | Johnson, Jr. | 715/501.1 |
| 2006/0004922 A1* | 1/2006 | Lahti et al. | 709/227 |

FOREIGN PATENT DOCUMENTS

| | | |
|---|---|---|
| JP | 2000-330852 A | 11/2000 |
| JP | 2001-222475 A | 8/2001 |
| JP | 2001-309439 | 11/2001 |

OTHER PUBLICATIONS

Hashimoto, S.; Kimura, Y.; Nonomure, I.; Yamada, T.; "Video Mail: An Experimental Mail System That Supports Video Data Transfer Over Prerailing Types of Networks," Technical Report of the Institute of Electronics, Information and Communication Engineers, Nov. 17, 1995, vol. 95, No. 373, pp. 13-18.

CN 200410031757.3, Chinese Office Action dated Jul. 14, 2006, w/ translation.

Kabashima, T., "Begin Windows Programming with F-BASIC V6," Maicon BASIC Magazine, Denpashinbunsya, Mar. 1, 2000, vol. 19, No. 3, pp. 84-87, in Japanese, with a concise explanation of relevance in English (1 pg.).

Japanese Office Action issued in JP 2003-083556, mailed Feb. 6, 2007, with full translation (3 pgs.).

* cited by examiner

| SUBSCRIBER NAME | TERMINAL IDENTIFIER | TELEPHONE NUMBER | E-MAIL ADDRESS | ADDRESS |
|---|---|---|---|---|
| Ichiro Sato | MS0001 | 0*0-1111-2222 | ichiro@abc.co.jp | ***Chuo-ku, Tokyo |
| Jiro Suzuki | MS0002 | 0*0-3333-4444 | jiro@abc.co.jp | ***Chiyoda-ku, Tokyo |
| Saburo Tanaka | MS0003 | 0*0-5555-6666 | saburo@abc.co.jp | ***Chiba-city, Chiba |

FIG. 7
| FOLDER NAME | MAILER IDENTIFIER |
|---|---|
| RECEPTION BOX | Native |
| TRANSMISSION BOX | Native |
| CHARACTER MAIL | Character |
FIG. 8
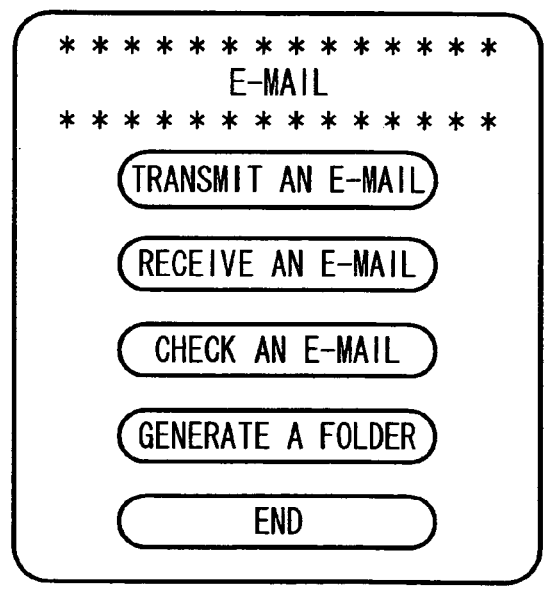
FIG. 9
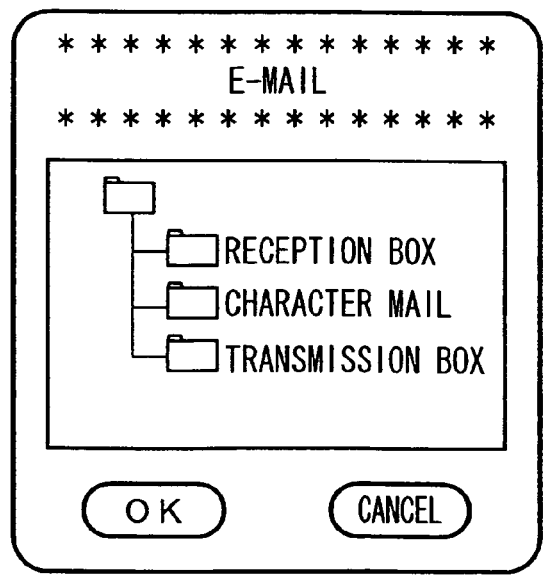

⋮
⋮
⋮

From: jiro <jiro@abc.co.jp>
To: ichiro <ichiro@abc.co.jp>
Subject       : HELLO
⋮
X-Mailer: character-mail
X-DCMChar: inu
⋮
⋮

COMMUNICATION TERMINAL OPERATIONAL WITH MULTIPLE APPLICATIONS

RELATED APPLICATIONS

This application claims priority under 35 U.S.C. §119 to Japanese Patent Application No. 2003-083556 filed Mar. 25, 2003, the entire content of which is hereby incorporated by reference.

TECHNICAL FIELD

The present invention relates to techniques for sorting and storing received data in a communication terminal.

BACKGROUND ART

For personal computers, various kinds of e-mail software have been developed by which e-mail to be transmitted is generated in the form of text or binary data. Some types of software have the function of a scheduler, or an animation function which looks as if a popular animation character is transmitting an e-mail (please refer to JP2001-222475). A user of a personal computer can select from various kinds of e-mail software, and install the selected software in a personal computer for use.

In recent years, it has become possible to transmit and receive e-mails not only by using a personal computer such as a desktop but also by a portable communication terminal such as a mobile phone. In a mobile phone which can transmit and receive e-mails, e-mail software is installed as native software. That is to say, the e-mail software available to a user of a mobile phone is limited to the software which is already installed in a mobile phone by the manufacturer. Consequently, a user cannot install and use software of his or her choice.

On the other hand, it is known that a user is able to install optional application software in a mobile phone. At the time of using software other than native software, the above mobile phone, for example, performs a packet communication with a server connected to the Internet, and downloads and installs application software generated by using a Java® programming language. It seems that the above problem can be solved by distributing e-mail software to the above mobile phone. However, from the viewpoint of protecting personal information stored in a mobile phone, the functionality of an application is limited to performing in accordance with the downloaded application software. For example, an application can read or write data only in a storage area assigned to an application by a mobile phone, or an application can communicate only with a server which downloads application software.

It is necessary to communicate with a mail server so that an application transmits and receives an e-mail. However, a conventional mobile phone operates a mailer in accordance with e-mail software downloaded from the Internet, and the mailer attempts to communicate with a mail server, but the mailer cannot communicate with a mail server due to the limitations described above.

Further, if a mailer, which is a native software, operated in accordance with an e-mail program receives an e-mail generated for a mailer operated in accordance with downloaded e-mail software (hereafter referred to as "Java mailer" since it is generated by using a Java programming language), the received e-mail is stored in a storage area that is different from a storage area for a Java mailer. That is to say, although an e-mail generated for a Java mailer is received successfully, the e-mail cannot be opened by a Java mailer.

DISCLOSURE OF INVENTION

In view of the foregoing, it is an object of the present invention to provide a technique for sorting and storing received data in a communication terminal to enable an application to use received data.

To solve the above problems, the present invention provides a communication terminal comprising reception means for receiving data, transmitted from a server, by a first application; specifying means for specifying a second application on the basis of the data received by the first application, the second application using the data received by the first application; writing means for writing in a storage unit, an identifier for indicating the second application specified by the specifying means, and the data received by the first application, the identifier correlating with the data received by the first application; reading means for, when the second application uses the data received by the first application, reading out from the storage unit to provide to the second application, data correlating with an identifier for indicating the second application.

According to the present invention, a communication terminal receives by a first application, data transmitted from a server, specifies on the basis of data received by the first application, a second application using data received by the first application, and stores the data correlating with an identifier in a storage unit, the identifier indicating a second application which uses the received data. The received data is used by a second application identified by the identifier correlating with the data.

BRIEF DESCRIPTION OF THE DRAWINGS

FIG. 7 is a diagram explaining a folder table name stored in nonvolatile memory 208.

FIG. 8 is a diagram explaining an example of a screen displayed when a native mail program is operated.

FIG. 9 is a diagram explaining an example of a screen list of folder icons displayed by a native mailer.

PREFERRED EMBODIMENT

The embodiments will now be described with reference to the drawings.

1. First Embodiment

<1-1. Configuration of the Embodiment>

<1-1-1. Overall Configuration>

Figure 1:
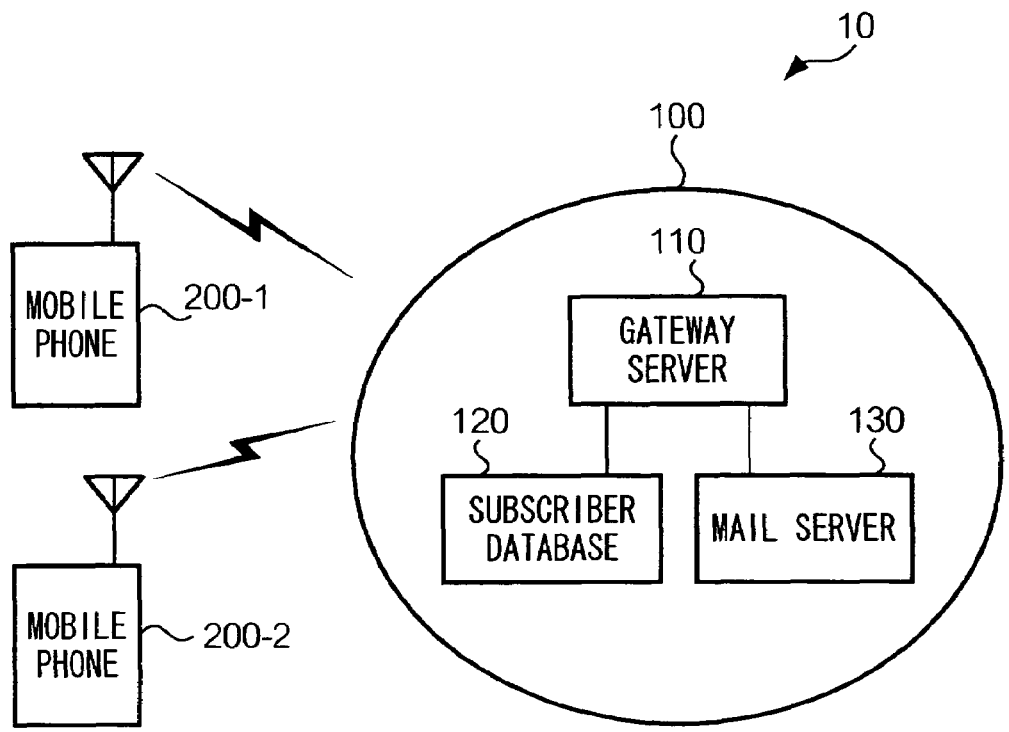
FIG. 1 is a diagram explaining the overall configuration of a communication system according to the embodiment of the present invention.

FIG. 1 is a diagram explaining the overall configuration of communication system 10 according to the embodiment of the present invention. There is a plurality of mobile phones in communication system 10; only mobile phone 200-1 and mobile phone 200-2 are shown in FIG. 1 for the sake of simplicity.

Mobile packet communication network 100 is a communication network which provides a data communication service. Mobile packet communication network 100 provides a data communication service using packet communication to a mobile phone owned by a person who has a contractual agreement with a telecommunication company. Mobile packet communication network 100 is comprised of a radio station (not shown here) which performs radio communication with a mobile phone, an exchange (not shown here) connected to a radio base station, a gateway exchange (not shown here) connected to an exchange and a fixed telephone line, a gateway server 110, a subscriber database 120, and a mail server 130.

Mobile phone 200-1 and mobile phone 200-2 (hereafter, referred to as "mobile phone 200" in the case that it is not necessary to distinguish both mobile phones) are mobile phones used by a user (not shown here), and can receive a data communication service provided by mobile packet communication network 100.

<1-2. Configuration of a Mobile Communication Network>

<1-2-1. Gateway Server>

Gateway server 110 mutually connects other networks such as the Internet (not shown here) and mobile packet communication network 100, and is connected to a gateway exchange. Gateway server 110 performs conversion of different communication protocols among the networks. Specifically, gateway server 110 performs mutual conversion of a protocol used in mobile packet communication network 100 and a TCP/IP used in other networks such as the Internet.

<1-2-2. Subscriber Database>

Figures 2, 4:
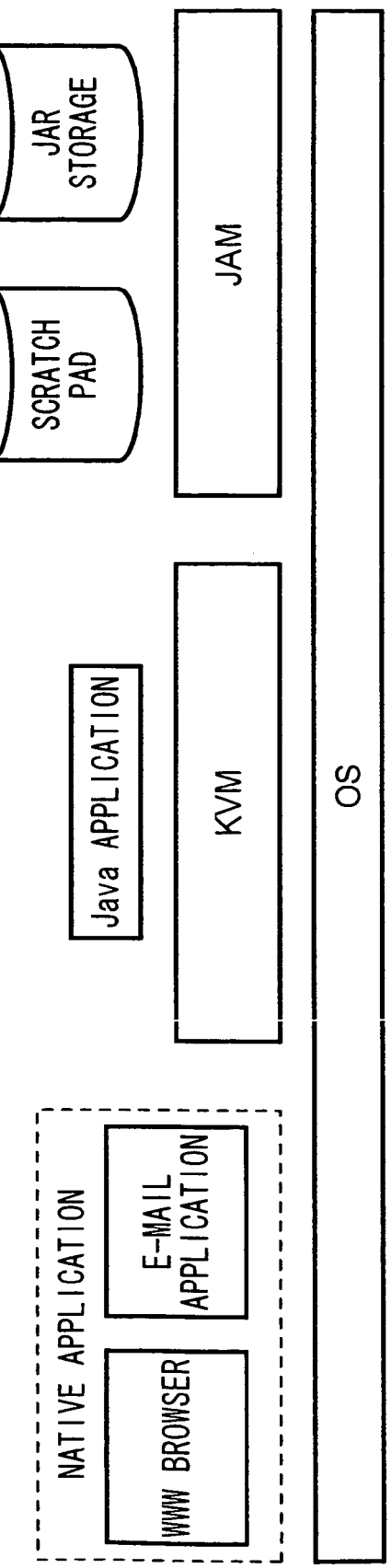
FIG. 2 is a diagram explaining an example of subscriber data stored in subscriber database 120 according to the embodiment of the present invention.
FIG. 4 is a block diagram explaining an example of a configuration of Java AP Runtime Environment.

Subscriber database 120 is a database which stores data with regard to a subscriber who makes a contract with a telecommunication company managing mobile packet communication network 100 for the use of mobile packet communication network 100. Subscriber database 120 is connected to gateway server 110. As shown in FIG. 2, subscriber data is stored in subscriber database 120, the data such as a terminal identifier for identifying mobile phone 200 owned by a subscriber, a phone number of mobile phone 200 owned by a subscriber, an address of a subscriber, and an e-mail address given to a subscriber by a communication company all of which correlates with a subscriber name.

<1-2-3. Mail Server>

Mail server 130 is a server for transmitting an e-mail to mobile phone 200, and has the same configuration as that of a conventional server. Mail server 130 is connected to gateway server 110. Mail server 130 has a storage device (not shown here: e.g. a hard disk device) for storing data permanently. A mail box, which is a storage area for storing an e-mail, is provided for each e-mail address given to a user of mobile phone 200.

When mail server 130 receives an e-mail, mail server 130 extracts an e-mail address which indicates a destination of an e-mail by referring to a header of the received e-mail. Then, when mail server 130 extracts the above e-mail address, mail server 130 stores the received e-mail in a mail box designated by the extracted e-mail address. When mail server 130 stores the received e-mail in a mail box, mail server 130 extracts from a header of the stored e-mail, an e-mail address which indicates an e-mail sender. Then, mail server 130 extracts the above e-mail address indicating a sender, and generates a notification (hereafter, referred to as "a mail arrival notification") for notifying that the above e-mail is stored in a mail box, to a person to which the designated e-mail address is given as a destination of the above received e-mail.

After generating a mail arrival notification, mail server 130 attempts to find the above designated e-mail address in subscriber database 120 to specify mobile phone 200 to which a mail arrival notification is to be transmitted. When mail server 130 finds the designated e-mail address in subscriber database 120, mail server 130 reads out from subscriber database 120, a terminal identifier for identifying mobile phone 200, the terminal identifier correlating with the designated e-mail address. Then, when mail server 130 reads out the above identifier, mail server 130 transmits the generated mail arrival information to mobile phone 200 identified by the above identifier.

<1-3. Configuration of a Mobile Phone>

Figure 3:
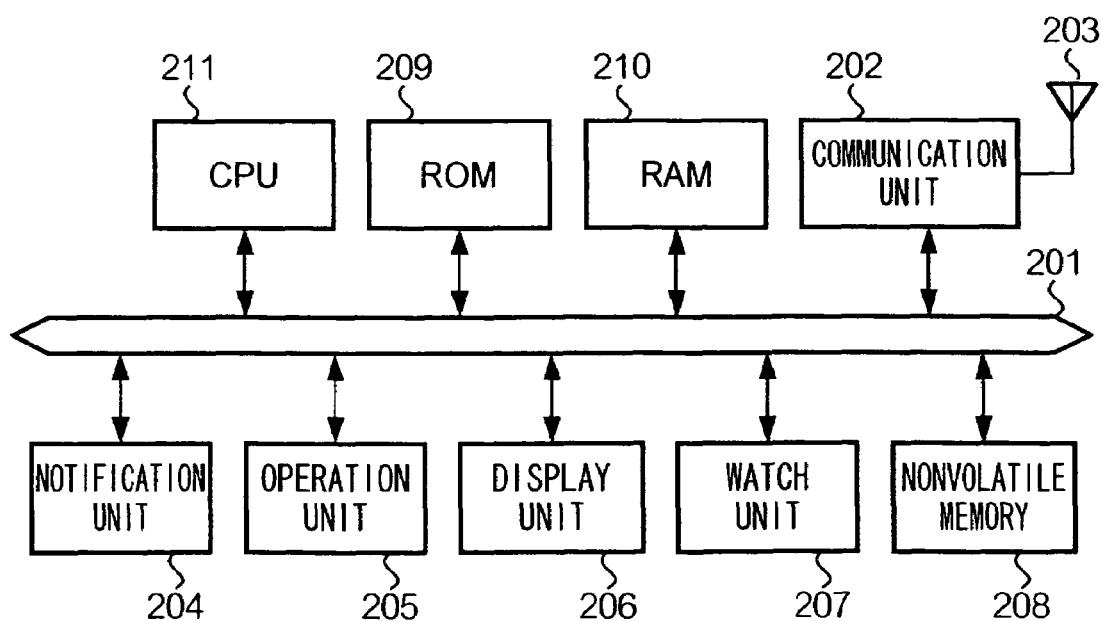
FIG. 3 is a diagram explaining an example of a hardware configuration of mobile phone 200 according to the embodiment of the present invention.

FIG. 3 is a diagram explaining an example of a hardware configuration of mobile phone 200. As shown in FIG. 3, each unit of mobile phone 200 is connected to a bus 201 except for an antenna 203. Each unit of mobile phone 200 performs data transmission and reception by way of bus 201 with each other.

A communication unit 202 has a function of a communication interface, and performs radio communication with a radio base station by way of antenna 203 connected to communication unit 202 controlled by CPU 211 (Central Processing Unit). A notification unit 204 has a speaker (not shown here). Under the control of CPU 211, notification unit 204 generates an arrival sound signal, which notifies that an e-mail is received, by using a speaker.

An operation unit 205 has a numeric keypad with a plurality of keys (not shown here), for inputting a user's instructions. When a user of mobile phone 200 manipulates operation unit 205, a signal is transmitted from operation unit 205 to CPU 211. A display unit 206 has, for example, a liquid display panel (not shown here) and a control circuit which performs display control for a liquid display panel, and display unit 206 displays on a liquid display panel, letters, graphic image, or a menu screen for manipulating mobile phone 200. A watch unit 207 is to provide data indicating date and time, and watch unit 207 provides the above data to CPU 211 controlled by CPU 211.

A nonvolatile memory 208 stores data for controlling mobile phone 200, and an application program (e.g. an e-mail application program which generates and opens an e-mail) generated by using a Java programming language and downloaded from a server connected to the Internet. Further, nonvolatile memory 208 stores an e-mail address given to a user of mobile phone 200, and a terminal identifier for identifying a mobile phone.

Various types of programs operated by CPU 211 are stored in ROM 209 (Read Only Memory). These programs are, for example, initialization programs for initializing each unit of mobile phone 200, an OS (Operating System) program for controlling IPL (Initial Program Loader) and mobile phone 200, an e-mail program (hereafter, referred to as "a native program") for transmitting and receiving an e-mail with mail server 130, a WWW (World Wide Web) browser program for realizing a WWW browser and the like. Further, a Java Runtime Environment program for realizing an application (hereafter, referred to as "Java-AP") by using a Java programming language is stored in ROM 209. RAM (Read Access Memory) 210 is used as a work area for CPU 211, and data used by CPU 211 is temporarily stored.

CPU 211 is to control each unit of mobile phone 200. When mobile phone 200 is turned on, CPU 211 reads out IPL from ROM 209. Then, when CPU 211 runs IPL, CPU 211 reads out an initialization program from ROM 209 for initializing CPU 211 and each unit of mobile phone 200. After the completion of initializing each unit of mobile phone 200 by an initialization program, CPU 211 reads out an OS program from ROM 209. Then, when CPU 211 runs an OS program, CPU 211 reads out a Java Runtime Environment program from ROM 209 for realizing Java AP Runtime Environment.

CPU 211 realizing an OS program runs a process in accordance with a signal inputted to CPU 211. For example, when a user of mobile phone 200 manipulates operation unit 205, the above CPU 211 specifies a user's instruction on the basis of a signal provided from operation unit 205 in accordance with a user's manipulation and a screen displayed on display unit 206, and runs a process in accordance with a user's instruction. Further, CPU 211 runs a process in accordance with data transmitted from communication unit 202.

<1-3-1. Java Runtime Environment>

FIG. 4 is a diagram explaining an example of the configuration of Java AP Runtime Environment being realized in accordance with a Java AP Runtime Environment program.

A JAR (Java Archive) storage is a storage area for storing Java-AP, and allocated in nonvolatile memory 208 by JAM (Java Application Manager). A scratch pad is a storage area for storing permanent data (data being stored although an application is terminated), and allocated in nonvolatile memory 208 for each Java-AP by JAM.

JAM is to manage a Java AP. JAM has a function of displaying a list of available Java AP stored in a JAR storage, managing a Java AP (to run a Java AP, or to terminate a Java AP forcefully), and installing or deleting a Java AP.

KVM (K Virtual Machine) is that JVM (Java Virtual Machine), which is operated by converting a Java byte code into a native code, is designed for a small embedded device, and KVM is designed to be used in a device which has constraints with regard to memory or CPU capability, and battery consumption.

<1-3-2. Application Mailer>

An e-mail application program (hereafter, referred to as "an e-mail-AP") downloaded from a server connected to the Internet is generated by using a Java programming language. An e-mail application (hereafter, referred to as "an application mailer") is operated in accordance with an e-mail-AP, and has a function of generating and opening an e-mail.

Figure 5:
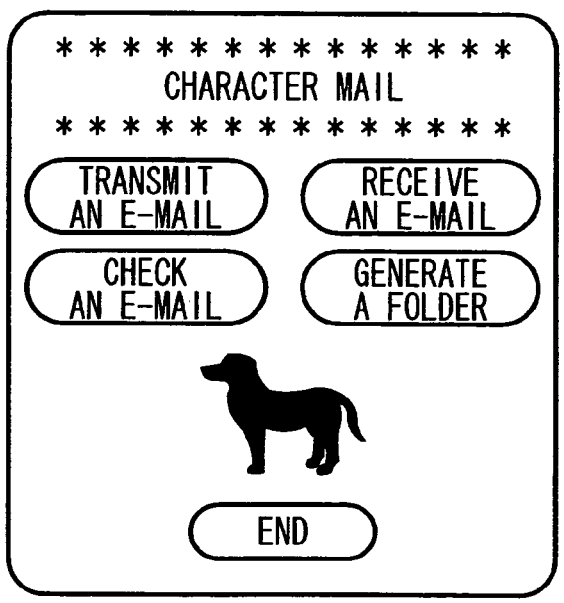
FIG. 5 is an example of a screen displayed when an e-mail AP is operated.
Figure 6:
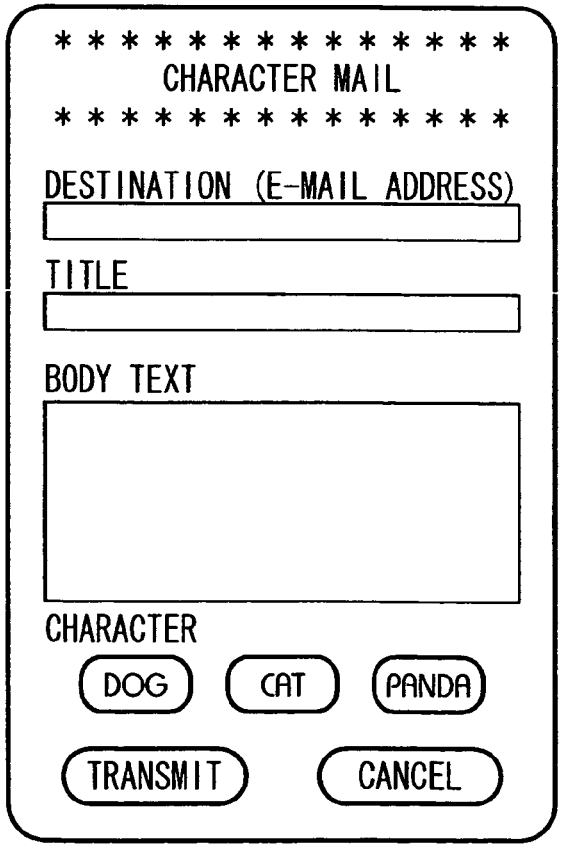
FIG. 6 is a diagram explaining an example of a screen for generating an e-mail displayed by an application mailer.

FIG. 5 is a diagram explaining a screen displayed on display unit 206 at the time of running an e-mail-AP. When a user of mobile phone 200 clicks on a email transmission button shown in FIG. 5, a screen for generating an e-mail shown in FIG. 6 is displayed on display unit 206. In mobile phone 200 shown in FIG. 6, when a user of mobile phone 200 inputs an e-mail address indicating a destination of an e-mail and an e-mail title and the body text of an e-mail, and designates an animated character for e-mail transmission, an e-mail is generated. In this case, an identifier for identifying a mailer, and an identifier for indicating the above designated character are written in a header of the generated e-mail. Specifically, an identifier for identifying a mailer is written in an X mailer field of a header, an identifier for indicating an animated character is written in an X-DCMChar field of a header.

When an application mailer receives an instruction for opening an e-mail which an identifier for identifying a mailer, and an identifier indicating an animated character designated by an e-mail sender are written in a header, an application mailer has a function of performing e-mail transmission by an animated character designated by an identifier written in a header.

<1-3-3. Application Mailer>

An e-mail application operated in accordance with a native mail program stored in ROM 209 (hereafter, referred to as "a native mailer") has a function of generating and opening an e-mail, and transmitting and receiving an e-mail by communicating with mail server 130. Further, a native mailer has a function of generating a folder icon for sorting a received e-mail correlating with a folder icon.

<1-3-4. Generating a Folder Icon for an Application Mailer>

An e-mail-AP generated by using a Java programming language is limited to communicating only with a server which downloads an e-mail-AP from a viewpoint of protecting personal information stored in a mobile phone. When an application mailer performs the transmission and reception of an e-mail by using an e-mail address provided by a communication company managing mobile packet communication network 100, an application mailer cannot communicate with mail server 130 due to the above limitation. Therefore, an application mailer performs the transmission and reception of an e-mail by using a native mailer.

An application mailer is operated in accordance with an e-mail-AP, and a screen in FIG. 5 is displayed on display unit 206. When a user of mobile phone 200 clicks on a "generate folder" button, an application mailer instructs JAM to generate a folder icon for an application mailer. An identifier for identifying a mailer and a folder name given to a folder icon are included in the instruction for generating a folder icon. JAM receiving the instruction instructs OS to run a native mail program, and OA runs a native mailer. Then, JAM instructs a native mailer to generate a folder icon for an application mailer. An identifier for identifying a mailer and a folder name given to a folder icon are included in the instruction to a native mailer.

A native mailer has a function of generating a folder icon in accordance with an instruction from JAM. A native mailer generates a folder icon for reception, having a folder name included in the above instruction by receiving an instruction to generate a folder icon. A folder name table is stored in nonvolatile memory 208 shown in FIG. 7, and managed by a native mailer. A native mailer generates a folder icon, and stores a folder name for the generated folder icon and an identifier for identifying a mailer, both of which correlates with each other.

The generated folder icon is confirmed by running a native mail program. When a user of mobile phone 200 inputs an instruction for running a native mail program by using operation unit 205, a native mail program is read out from ROM 209. Then, a screen shown in FIG. 8 is displayed on display unit 206 by running a native mailer. Then, when a user of mobile phone 200 clicks on a "check e-mail" button in FIG. 8, a folder name and a folder icon for sorting and managing e-mails are displayed on display unit 206.

<1-3-5. E-mail Transmission by an Application Mailer>

When a user of mobile phone 200 inputs an instruction for transmitting an e-mail generated by an application mailer, the instruction is transmitted from an application mailer to JAM. Then, JAM stores in nonvolatile memory 208 by receiving the instruction, the generated e-mail correlating with a folder name of a folder icon "transmission box" managed by a native mailer. Then, JAM stores the generated e-mail in nonvolatile memory 208, and instructs OS to run a native mail program.

OS runs a native mailer in accordance with a native mail program. A native mailer checks in nonvolatile memory 208 whether an e-mail correlating with "transmission box" exists. A native mailer instructs OS to terminate the native mailer if a native mailer determines that an e-mail correlating with "transmission box" does not exist. Then, OS terminates a native mailer by receiving the above instruction. On the other hand, when a native mailer detects an e-mail correlating with "transmission box" in nonvolatile memory 208, the native mailer reads out the detected e-mail to transmit to mail server 130. After carrying out the transmission to mail server 130, the native mailer instructs OS to terminate the native mailer. Then, OS terminates the native mailer by receiving the above instruction.

<1-3-6. Reception of an E-Mail>

Figure 10:
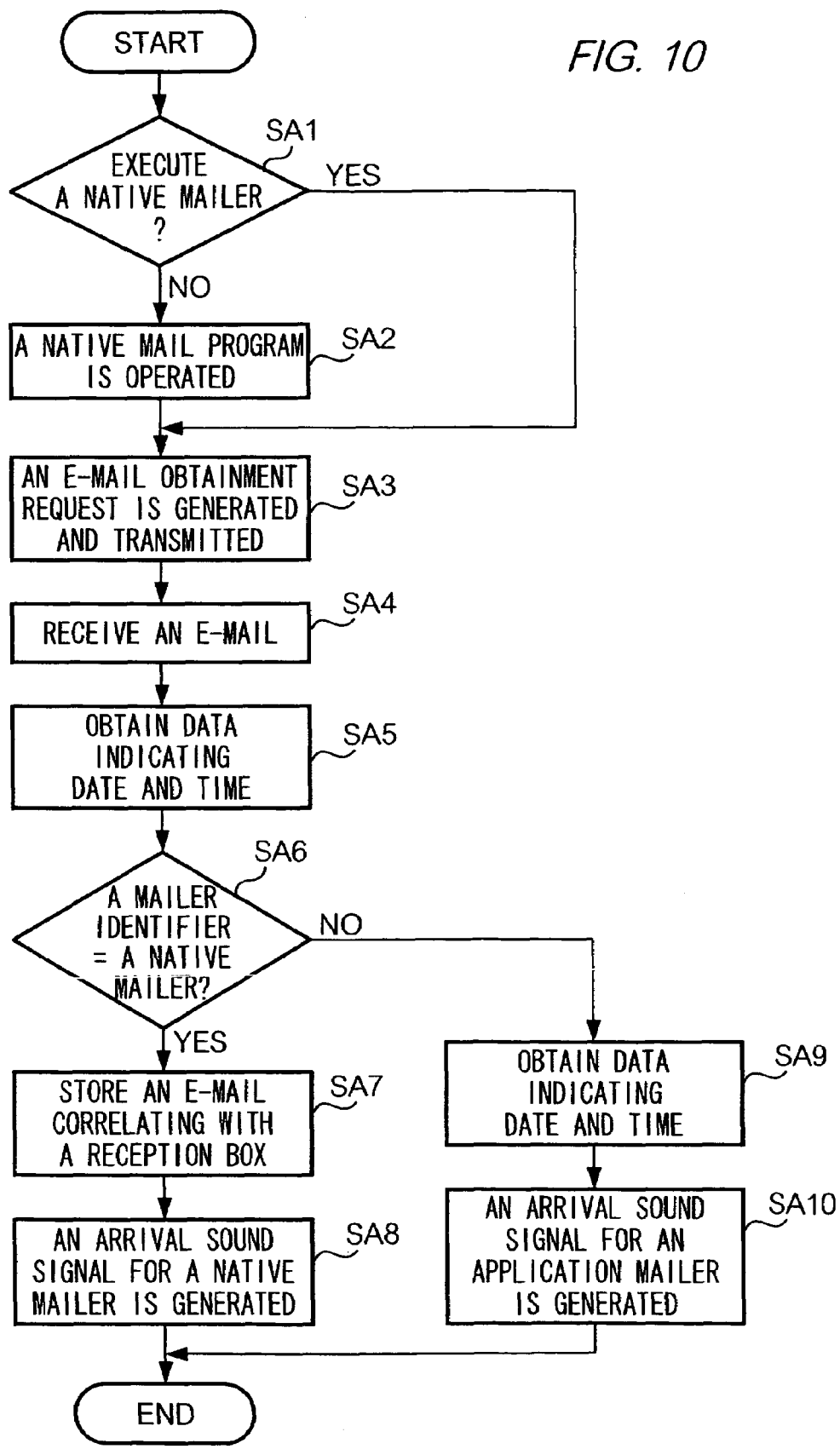
FIG. 10 is a flowchart explaining an example of a flow process operated in mobile phone 200 at the time of receiving an e-mail.

In receiving an e-mail, a flow process operated in mobile phone 200 will be described with reference to a flowchart 200 in FIG. 10.

When mobile phone 200 receives a mail arrival notification transmitted from a mail server, OS determines whether a native mailer is operated. In the case of running a native mailer (SA1: yes), the process goes to SA3. OS determines whether a native mailer is not operated (SA1: no), a native mail program is read out from ROM 209 to run a native mailer (SA2).

Next, in mobile phone 200, OS notifies a native mailer that a mail arrival notification is received from a mail server. Then, a native mailer generates an e-mail obtainment request for requesting to transmit to mobile phone 200, an e-mail stored in a mail box of mail server 130. An e-mail address given to a user of mobile phone 200 is read out from nonvolatile memory 208, and included in an e-mail obtainment request. An e-mail obtainment request is transmitted to mail server 130 from mobile phone 200 (SA3).

When mobile phone 200 receives an e-mail transmitted from mail server 130 as a response to an e-mail obtainment request (SA4), OS obtains data indicating date and time from watch unit 207 (SA5). Then, OS provides the received e-mail and the data indicating date and time to a native mailer. A native mailer refers to a header of the received e-mail, and determines whether an identifier for indicating a native mailer is written in a field of "X-mailer" for identifying a mailer (SA6).

In the case of a native mailer determining that an identifier for indicating a native mailer is written in a header of the received e-mail (SA6: yes), data indicating date and time, and the received e-mail correlating with a folder name "reception box" are stored in nonvolatile memory 208 (SA7). Then, a native mailer instructs OS to generate an arrival sound signal. When OS receives the above instruction, the reception of an e-mail is notified to a user of mobile phone 200 by the arrival sound signal controlled by notification unit 204 (SA8).

In the case of a native mailer determining that an identifier for indicating a native mailer is not written in a header of the received e-mail (SA6:no), a native mailer checks a folder name table stored in nonvolatile memory 208 by referring to an identifier written in a field of "X-mailer". Then, when a native mailer detects an identifier in a folder name table, a native mailer obtains a folder name correlating with an identifier. Then, a native mailer stores in nonvolatile memory 208, data indicating date and time, an obtained folder name and an e-mail, each of which correlates with each other (SA9).

In the case that a native mailer stores in nonvolatile memory 208, a received e-mail correlating with a folder name of a folder icon generated for an application mailer, a native mailer instructs OS to generate an arrival sound signal that is different from the case of storing a received e-mail correlating with "reception box". When OS receives the above instruction, the reception of an e-mail generated by using an application mailer is notified to a user of mobile phone 200 by an arrival sound signal controlled by notification unit 204 (SA10).

<1-3-7. Display of a Received E-Mail>

When a user of mobile phone 200 inputs an instruction to run an e-mail AP by using operation unit 205, a signal is provided to CPU 211.

Then, the above signal from operation unit 205 is provided to CPU 211, CPU 211 reads out an e-mail AP stored in nonvolatile memory 208, and runs an application mailer in accordance with an e-mail AP. When the CPU reads out an e-mail AP, a screen in FIG. 5 is displayed on display 206 at the time of activating mobile phone 200.

When a user of mobile phone 200 clicks on a "check e-mail" button in FIG. 5, an application mailer instructs JAM to obtain an e-mail title and its reception date, correlating with a folder name for an application mailer, stored in nonvolatile memory 208. An identifier for identifying an application mailer is included in the above instruction. JAM obtains a folder name correlating with identifier included in the instruction by referring to a folder name table. Then, when JAM detects an e-mail correlating with the obtained folder name, JAM extracts an e-mail title and an identifier (message ID), written in a field of "Message-ID", for identifying an e-mail optionally by referring to a header of an e-mail. Further, JAM extracts reception date and time correlating with an e-mail.

JAM extracts data indicating reception date and time, and an e-mail title, and provides them to an application mailer. An application mailer generates an e-mail list correlating with a folder name for an application mailer on the basis of the above data provided by JAM. Specifically, an application mailer generates a list correlating with an e-mail title, an e-mail reception date and time, and a message ID. After generating a list, an application mailer processes to display a list excluding a message ID, and displays a screen list of an e-mail shown in FIG. 11 under the control of display unit 206.

A user of mobile phone 200 selects one of the e-mail titles on a list by checking the above list, and inputs an instruction displaying the text body of an e-mail designated by the selected title. An application mailer obtains a message ID correlating with the selected ID from the generated list. Then, an application mailer instructs JAM to obtain an e-mail designated by the obtained message ID. JAM attempts to detect an e-mail correlating with a folder name for an application mailer. When JAM detects an e-mail of a message ID selected by a user of mobile phone 200, JAM extracts an e-mail, and provides the extracted e-mail to an application mailer. An application mailer refers to a header of the e-mail, and extracts an identifier indicating a character designated by an e-mail sender. Then, an application mailer processes to display a character designated by the above identifier, and an animation is displayed showing an animated character transmitting an e-mail controlled by display unit 206. After an animation is displayed, an application mailer processes to display a text body of the above e-mail, and the text body is displayed under the control of display unit 206.

2. An Example of Operation

The operation when mobile phone 200-1 receives an e-mail transmitted from mobile phone 200-2 will be described. It is assumed that an e-mail AP is already installed in mobile phone 200-1 and mobile phone 200-2. Further, an e-mail AP is already operated in mobile phone 200-2. Further, a folder icon for an application mailer is already generated in mobile phone 200-1 by manipulation of a user of mobile phone 200-1.

Figures 11, 12:
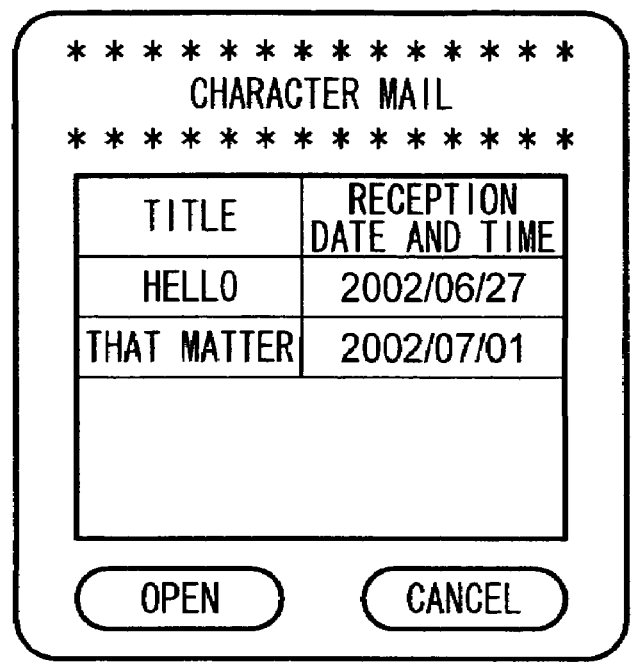
FIG. 11 is a diagram explaining an example of a screen list of an e-mail displayed by an application mailer.
FIG. 12 is explaining an example of a header generated by an application mailer.

In a screen of FIG. 6, when a user of mobile phone 200-2 inputs an e-mail address "ichiro@abc.co.jp", an e-mail title, and the text body of an e-mail by using operation unit 205, the input e-mail address, email title, and message are displayed on display unit 206. Then, when a user of mobile phone 200-2 designates an animated character image of a dog in an application mailer receiving an e-mail, and inputs an instruction for transmitting an e-mail by using operation unit 205, as shown in FIG. 12, an e-mail is generated with an e-mail address "jiro@abc.co.jp" given to a user of mobile phone 200, an identifier "character-mail" for identifying an application mailer, and an identifier "inu" for identifying a character designated by an e-mail sender are written in a header of an e-mail.

Then, an instruction for transmitting the generated e-mail is transmitted from an application mailer to JAM.

JAM stores in nonvolatile memory 208, the generated e-mail correlating with a folder name "transmission box" of a folder icon managed by a native mailer. Then, JAM instructs OS to run a native mail program.

A native mailer is operated in accordance with a native mail program. A native mailer reads out an e-mail correlating with "transmission box", and transmits the read-out e-mail to mail server 130. Then, a native mailer instructs OS to terminate a native mailer, and OS terminates a native mailer.

An e-mail transmitted from mobile phone 200-2 is transmitted to mail server 130 through a radio station, an exchange, a gateway exchange, and gateway server 110 in mobile packet communication network 100. When mail server 130 receives an e-mail from mobile phone 200-2, mail server 130 extracts from a header of an e-mail, an e-mail address "ichiro@abc.co.jp" designated as a destination of an e-mail, and stores the received e-mail in a mail box designated by the extracted e-mail address.

Then, mail server 130 generates a mail arrival notification. After generating a mail arrival notification, mail server 130 checks subscriber data base 120 by referring to "ichiro@abc.co.jp" (destination of e-mail) to specify where a mail arrival notification is transmitted from. When mail server 130 detects the appropriate e-mail address from subscriber data base 120 in FIG. 2, mail server 130 reads out from subscriber data base 120, a terminal identifier "MS0001", correlating with the above e-mail address, for identifying mobile phone 200-1. Then, mail server 130 transmits the generated mail arrival notification to mobile phone 200-1 identified by the above terminal identifier.

In mobile phone 200-1, a native mailer is operated by receiving a mail arrival notification. Then, an e-mail obtainment request indicating that an e-mail stored in a mail box must be transmitted to mobile phone-200, is generated. An e-mail address provided to a user of mobile phone 200-1 is included in an e-mail obtainment request transmitted from mobile phone 200-1 to mail server 130.

When mail server 130 receives an e-mail obtainment request from mobile phone 200-1, mail server 130 extracts an e-mail address included in an e-mail obtainment request, and reads out an e-mail from a mail box designated by the extracted e-mail address. Then, mail server 130 transmits the read-out e-mail to mobile phone 200-1.

Mobile phone 200-1 running a native mailer receives the above e-mail from mail server 130, mobile phone 200-1 obtains data indicating date and time from watch unit 207. The above data from watch unit 207 is regarded as data indicating that an e-mail is received. Then, mobile phone 200-1 refers to a header of the received e-mail. Since an identifier "character-mail" is written in an "X-Mailer field" of an e-mail transmitted from mobile phone 200-2, mobile phone 200-1 checks a folder name table stored in nonvolatile memory 208 by referring to the above identifier. When mobile phone 200-1 detects the above identifier, mobile phone 200-1 obtains a folder name correlating with an identifier, and stores in nonvolatile memory 208, data indicating date and time, the received e-mail, and the obtained folder name, each of which correlates with each other.

After an e-mail correlating with a folder name, generated for an application mailer, is stored in nonvolatile memory 208, the reception of the e-mail is notified to a user of mobile phone 200-1 by an arrival sound signal controlled by notification unit 204. Then, a user of mobile phone 200-1 executes an instruction to for operating an application mailer by using operation unit 205 of mobile phone 200-1, by which an application mailer is operated in mobile phone 200-1, and a screen in FIG. 5 is displayed on display unit 206.

When a user of a mobile phone clicks on a "check e-mail" button, an e-mail title, a message ID, and reception date and time are extracted in mobile phone 200- 1, each of which correlates with a folder name "character mail" for an application mailer. Next, an e-mail list is generated in mobile phone 200-1 that the e-mail list correlating with a folder name "character mail". The above e-mail list is comprised of an e-mail title, reception date and time, and a message ID. Then, a list excluding a message ID is displayed in mobile phone 200-1 as shown in FIG. 11.

When a user of mobile phone 200-1 selects one of the e-mail titles on a list, and inputs an instruction for displaying the text body of an e-mail designated by the selected title by using operation unit 205, a message ID correlating with the selected e-mail title is obtained by mobile phone 200-1. Then, an e-mail designated by a message ID is read out from nonvolatile memory 208 in mobile phone 200-1. Then, in mobile phone 200-1, an identifier indicating a character designated by an e-mail sender is extracted by referring to a header of the read out e-mail. Then, the process for displaying a character designated by the above identifier is operated in mobile phone 200-1. An animation is displayed showing an animated character designated by the above identifier transmitting an e-mail under the control of display unit 206. After an animation is displayed, a text body of the read-out e-mail is displayed under the control of display unit 206.

As described above, according to the embodiment, although an application mailer cannot communicate with mail server 130, the present invention makes it possible to perform the transmission and reception of an e-mail by using a native mailer cooperating with an application mailer. Further, although an application mailer can read or write data only in a specified storage area, the present invention enables an application mailer to manage an e-mail obtained by a native mailer by using JAM and a native mailer. For example, although a plurality of mailers are used in one mobile phone, only a native mailer performs the transmission and reception of an e-mail, therefore, the problem of an e-mail received by an application mailer not being read by a native mailer can be solved. Further, a program downloaded from the network may be generated by a malicious person. However, according to the present invention, an application mailer cannot read or write data directly to nonvolatile memory 208 that an application mailer operated in accordance with a program downloaded from the network, therefore, although an application mailer attempts to read or write data directly to nonvolatile memory 208 in a malicious manner, data cannot be read or written.

3. Modification

Modification 1:

The reception of an e-mail may be notified in a different way at the time of receiving an e-mail generated by a native mailer. For example, in the case of receiving an e-mail generated by a native mailer, the reception of an e-mail may be notified by an arrival sound signal, and in the case of receiving an e-mail generated by an application mailer, the reception of an e-mail may be notified by a vibration.

In the above embodiment, an arrival sound signal is generated by a native mailer. However, in the case of storing an e-mail correlating with a folder for an application mailer, an application mailer may generate the arrival sound signal Modification 2:

In the above embodiment, mobile phone 200 generates an arrival sound signal at the time of receiving an e-mail. However, in this modification, an application mailer may check periodically whether an e-mail is received by mobile phone 200, and the application mailer may generate an arrival sound signal at the time of recognizing that mobile phone 200 has received an e-mail.

Modification 3:

With regard to sorting e-mails, it is not limited to only using an identifier for identifying mailers in the above embodiment. E-mails may be sorted by using a "FROM" address written in a header. Further, a native mailer sorts e-mail in the above embodiment, but a user of mobile phone 200 may sort e-mails manually.

Modification 4:

A folder icon for an application mailer is used only for receiving e-mails in the above embodiment, but it may be used for transmitting e-mails.

Modification 5:

An application mailer may have a scheduler function. Further, in the case of receiving an e-mail having an instruction to change a schedule generated by an application mailer, it is possible to change a schedule stored in a mobile phone by checking an e-mail.

Modification 6:

In the above embodiment, when mobile phone 200 receives a mail arrival notification, a native mail program is automatically operated, and mobile phone 200 receives an e-mail. But, when mobile phone 200 receives a mail arrival notification, a mail arrival notification is notified to a user of mobile phone 200 at the time of receiving an e-mail, and a native mailer may be operated by a user of mobile phone 200 manipulating mobile phone 200 to run a native mail program.

Modification 7:

In the above embodiment, an application mailer is operated by a user of mobile phone 200 manipulating mobile phone 200 to run an application mailer, but an application mailer may be operated by a user of mobile phone 200 clicking on a button of a folder icon for an application mailer.

Modification 8:

In the above embodiment, a user of mobile phone 200 who is notified of receiving an e-mail instructs mobile phone 200 to run an e-mail AP, but an e-mail AP may be operated automatically in mobile phone 200. Further, a received e-mail may be displayed automatically on display unit 206. Further, a received e-mail may not be stored automatically in nonvolatile memory 208 at the time of receiving an e-mail.

Modification 9:

In the case that a native mailer is not operated when mobile phone 200 receives a mail arrival notification, a native mailer may be terminated after mobile phone 200 receives an e-mail.

Modification 10:

When mobile phone 200 receives a mail arrival notification in the case that an application mailer is operated, but a native mailer is not operated, the present invention may be operated by an e-mail AP being terminated temporarily, and an e-mail AP is reoperated after mobile phone 200 receives an e-mail by running a native mailer.

Modification 11:

In the above embodiment, mobile phone 200 transmits an e-mail after an e-mail is stored in nonvolatile memory 208 correlating with a transmission folder, but, without storing an e-mail in nonvolatile memory 208, mobile phone 200 may instruct a native mailer to transmit an e-mail by providing an e-mail from JAM to a native mailer after a native mailer is operated.

Modification 12:

In the above embodiment, a native mail program is stored in ROM 209, but it is not limited to storing in ROM 209. A native mail program may be stored in nonvolatile memory 208. Further, the present invention may be operated by a removable nonvolatile memory (e.g. an IC card) being installed in mobile phone 200, and an e-mail is stored in a removable nonvolatile memory. According to this embodiment, although an e-mail AP for displaying an e-mail is not stored in mobile phone 200-1, a received e-mail is displayed by reinstalling a removable nonvolatile memory in a mobile phone storing an e-mail AP for displaying a received e-mail.

Modification 13:

Each program stored in ROM 209 of mobile phone 200 may be rewritten. One of the examples for rewriting a program will be described. For example, a user inserts in a CD-ROM (Compact Disk Read Only Memory) drive of a personal computer, a recording media (e.g. a CD-ROM) which records each program, and a user connects a personal computer to a mobile phone using a flash ROM by a cable in place of ROM 209. A personal computer reads out each program stored in a CD-ROM, and transmits read-out programs to a mobile phone connected by a cable. As a result, it is possible to upgrade each program stored in a mobile phone by a mobile phone writing the received programs in a flash CD-ROM.

Modification 14:

In modification 13, a CD-ROM is exemplified as a recording media which records each program, but a recording media is not limited to a CD-ROM. For example, a recording media may be a DVD-ROM, an IC card installing a flash ROM, or a floppy disk. Further, programs downloaded from a server connected to the Internet may be distributed by storing programs in the above recording media.

Modification 15:

In the above embodiment, an OS program and a native mail program are different programs, but an OS program may have a function of a native mail program.

Further, mobile phone 200 and mobile communication network 100 described above may be compliant with IMT-2000 (International Mobile Telecommunication 2000).

Modification 16:

With regard to the reception and transmission of an e-mail, it is not limited to between mobile phones 200. The present invention may be operated by an e-mail AP (for a personal computer) being generated, and installed in a personal computer, and the reception and transmission of an e-mail is operated between mobile phone 200 and a personal computer connected to the Internet.

Modification 17:

In the above embodiment, an application program is a program generated by using a Java programming language and the application program is downloaded from a server connected to the Internet and installed in mobile phone 200, but an application program is not limited to being generated by using a Java programming language. An application program may be generated by using other programming languages. In the case of running an application program by using other programming languages, mobile phone 200 is provided with a runtime environment for making an application program operable by using other programming languages.

Modification 18:

In the above embodiment, only one e-mail AP is stored in a storage unit, but a plurality of e-mail APs having different functions may be stored in a storage unit.

Modification 19:

In the above embodiment, JAM reads out an e-mail from a storage unit when an application mailer displays an e-mail, but the present invention may be operated by JAM activating a native mailer, and the native mailer provides an e-mail to JAM by reading out an e-mail from a storage unit, and JAM provides an e-mail to an application mailer.

Modification 20:

An identifier for identifying a mailer may be deleted from a header at the time of forwarding an e-mail, or transmitting an e-mail outside a mobile phone by a cable connection or through infra red communication.

Modification 21:

In the above embodiment, an identifier for identifying a mailer is written in a header of an e-mail, but a position for writing an identifier is not limited to a header. It may be written within the text body of an e-mail by using an escape sequence Modification 22:

In the above embodiment, an identifier written in a "Message-ID" field of an e-mail header is used as an identifier for identifying an e-mail, an identifier for identifying an e-mail is not limited to an identifier written above. An identifier may be provided to an e-mail when a native mailer receives an e-mail.

Modification 23:

A folder for an application mailer may remain undeleted at the time that an application mailer is deleted from a mobile phone. In this embodiment, other mailers using the same identifier as that of a mailer are able to use an e-mail undeleted from a mobile phone.

Modification 24:

In the case of opening an e-mail sorted in a folder for an application mailer by using an application mailer, an e-mail status may be displayed as an already-read message at the time of referring to a folder by using a native mailer.

Modification 25:

In the above embodiment, an e-mail is exemplified as data used by an application, and a mailer is exemplified as an application processing data, but data is not limited to an e-mail, and an application is not limited to a mailer. Data distributed to a mobile phone may be other data or applications if distributed data are sorted in an appropriate manner to enable applications to use distributed data. For example, the present invention may be operated by game data being transmitted to a mobile phone from a server connected to mobile packet communication network by a push method, and a mobile phone sorts received data in an appropriate manner, and stores received data in a storage unit to enable an application to use received data.

Modification 26:

An application mailer may write in the text body of an e-mail to be generated, a URL (Uniform Resource Locator) indicating a storage place of an e-mail AP for running an application mailer. In this embodiment, although an e-mail AP is not installed in mobile phone 200 which receives an e-mail generated by an application mailer, a user mobile phone 200 may download and install an e-mail AP in mobile phone 200. Further, when a user of mobile phone 200 clicks on a URL written in the text body of an e-mail, mobile phone 200 may prompt a user to download an e-mail AP by mobile phone 200 activating a WWW browser automatically, or mobile phone 200 may download and install an e-mail AP in mobile phone 200.

Modification 27:

The timing of generating a folder for an application mailer is not limited to that of the above embodiment. The present invention may be operated by information indicating a folder used by an application mailer being written in an ADF (Application Descriptor File) downloaded at the time of downloading an e-mail application program which is a Java application program, and JAM generates a folder automatically by referring to ADF at the time of downloading ADF.

Modification 28:

In the case of mobile phone 200 not having an e-mail AP receives an e-mail generated by an e-mail AP, an e-mail may be stored in a folder for a native mailer. Then, after an e-mail AP is installed in mobile phone 200, when a user of mobile phone 200 generates a folder for an application mailer, or when a folder for an application mailer is generated at the time of installing an e-mail AP as described in the above modification, an e-mail generated by an e-mail AP may be transmitted from a folder for a native mailer to a folder for an application mailer. In this embodiment, an e-mail is stored in an appropriate folder without inconveniencing a user of mobile phone 200.

Modification 29:

An application mailer may encode in accordance with a system such as BASE64 and write in an e-mail at the time of generating an e-mail, image data for displaying characters, or data for displaying an image that a character delivers a letter(s). Then, when mobile phone 200 in which an e-mail AP is installed receives an e-mail, mobile phone 200 may display a character, or an image showing that a character delivers letter(s) by decoding encoded data written in an e-mail. In this embodiment, although a Java application or a Java mailer can communicate only with a specific server, they can receive and use various data transmitted by a push style communication using e-mails. Further, although mobile phones can process only e-mails in between mobile phones, the transmission and reception of data other than text data is operated in between applications to be operated in mobile phone 200, therefore, the cooperation between applications is operated. Further, a system for encoding data is not limited to BASE 64 system; other encoding systems are also acceptable.

The invention claimed is:

1. A communication terminal operational with at least two applications, each of said at least two applications operable to provide a user interface, the communication terminal comprising:

a control unit operable in said communication terminal and configured to receive a first email message from an email server that includes an email address of a sender and an intended recipient, wherein there are two types of email messages;

said control unit further configured to determine whether said first email message is a first type of email message or a second type of email message that is different from said first type of email message;

said control unit further configured to execute a first application operable on said communication terminal to read only said first type of email message; and said control unit further configured to execute a second application operable on said communication terminal to read at least said second type of email message;

said second application is further executable to enable said first application to transmit a second email message to a designated recipient, said second email message generated for transmission with only said second application, to include a header and an email address of a designated recipient of said second email message; and said control unit is further configured to store, in a specified storage area, the second email message, and to execute said first application to transmit said second email message for receipt by said designated recipient.

2. The communication terminal of claim 1, wherein said first application is executable to generate or open email messages.

3. The communication terminal of claim 2, wherein said second application is downloadable to said mobile communication terminal, said second application also operable in said communication terminal to generate or open email messages.

4. The communication terminal of claim 3, wherein only said first application is executable to communicate with said email server to transmit and receive email messages.

5. The communication terminal of claim 1, wherein said second application is further executable to store said second email message generated for transmission in association with a transmission folder that is accessible with said first application, wherein said first email application is further executable to transmit for receipt by said email server email messages associated with said transmission folder.

6. The communication terminal of claim 1, wherein said control unit is further configured to determine if said received first email message is compatible with said first application or said second application based on an identifier included in said first email message.

7. The communication terminal of claim 1, wherein said first type of email message is storable in association with a predetermined reception folder that is associated with said first application, and said second type of email message is storable in association with a folder identified with said first email message, wherein said second type of email message is storable in association with said second application.

8. The communication terminal of claim 1, wherein said second type of email message includes an identifier that is not included in said first type of email message.

9. The communication terminal of claim 8, wherein said identifier comprises at least one of a character mail identifier or a character identifier.

10. The communication terminal of claim 1, further comprising a storage in communication with said control unit, wherein said storage is a removable storage unit detachably coupled with said communication terminal; and an identifier of said second application is stored in said storage in accordance with said first email message and said second email message.

11. The communication terminal of claim 10, wherein the second email message generated with the second application that is stored in the specified storage area is stored in the storage in a transmission box folder, and the first application is executable with the control unit to check for the second email message stored in the transmission box folder, and read out the second email message stored therein for transmission to the email server.

12. The communication terminal of claim 1, wherein said first application is executable with said control unit to communicate with said email server; and said second application is not executable with said control unit to communicate with said email server.

13. The communication terminal of claim 1, wherein said first application and said second application are each configured to provide a user with a respective user interface to independently read and generate email messages that include an email address indicating a destination, an email title, and a body of text.

14. A method of executing at least two applications with a communication terminal, the method comprising:

receiving, at said communication terminal from an email server, a first email message that includes an email address of a sender and an intended recipient, wherein there are two types of email messages;

determining with said communication terminal whether said first email message is a first type of email message or a second type of email message;

executing a first application operable on said communication terminal to read only said first type of email message;

executing a second application operable on said communication terminal to read at least said second type of email message;

executing said second application operable on said communication terminal to generate a second email message that is generated to include identification of a designated recipient of said second email message;

storing said second email message in a predetermined storage location; and executing said first application operable on said communication terminal to transmit said second email message to said designated recipient in response to storage of said second email message in said predetermined storage location.

15. The method of claim 14, wherein determining whether said first email message is a first type of email message or a second type of email message further comprises determining from an identifier included in said first email message if said first email message is compatible with said first application or said second application.

16. The method of claim 15, further comprising storing said first email message and data related to receipt of said first email message in a predetermined reception box folder associated with said first application when said first email message is determined to be compatible with said first application; and storing said first email message and data related to receipt of said first email message in a folder designated within said first email message and associated with said second application when said first email message is determined to be compatible with said second application.

17. The method of claim 16, further comprising the step of said second application instructing said first application to generate said folder and a folder table, said second application executable to display data associated with said first email message stored in said folder as a function of said folder table.

18. The method of claim 15, wherein determining from an identifier included in said first email message if said first email message is compatible comprises the step of reading an identifier included in a header of said first email message to determine if said first application or said second application is indicated.

19. The method of claim 18, wherein storing said first email message and data related to receipt of said first email message in a folder designated within said first email message comprises the steps of checking a table stored in said communication terminal for said identifier and a corresponding folder name, and storing said data related to said first email message in said folder that is associated with said identifier and is accessible by execution of said second application.

20. The method of claim 19, further comprising the step of executing said second application to access said folder based on said identifier and to display a listing that includes an email title, an email reception date, and an email reception time of said first email message that is retrieved from said folder.

21. The method of claim 20, further comprising the steps of said second application obtaining a message identification associated with said listing, and extracting said first email message from a stored location for display based on said message identification.

22. The method of claim 14, further comprising generating a first email arrival indication to a user in response to said first email message being determined to be said first type of email message, and generating a second email arrival indication to said user that is different than said first email arrival indication in response to said first email message being determined to be said second type of email message.

23. The method of claim 14, wherein said first email message includes an identifier that comprises a character identifier designated by a sender of said first email message, and the method further comprises said second application executable to display an animation of a character indicated with said character identifier followed sequentially by display of a content of said first email message.

* * * * *